US009594624B2

United States Patent
Charters et al.

(10) Patent No.: US 9,594,624 B2
(45) Date of Patent: Mar. 14, 2017

(54) RESOLVING AND PREVENTING COMPUTER SYSTEM FAILURES CAUSED BY CHANGES TO THE INSTALLED SOFTWARE

(71) Applicant: International Business Machines Corporation, Armonk, NY (US)

(72) Inventors: Graham C. Charters, Southampton (GB); Travis J. Kirke, East Victoria Park (AU); Alexander H. Poga, Peppermint Grove (AU); Mark A. Shewell, East Victoria Park (AU)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 14/737,652

(22) Filed: Jun. 12, 2015

(65) Prior Publication Data
US 2016/0364286 A1    Dec. 15, 2016

(51) Int. Cl.
| | | |
|---|---|---|
| *G06F 11/00* | (2006.01) | |
| *G06F 11/07* | (2006.01) | |
| *G06F 11/14* | (2006.01) | |

(52) U.S. Cl.
CPC ........ *G06F 11/0793* (2013.01); *G06F 11/079* (2013.01); *G06F 11/0751* (2013.01); *G06F 11/1451* (2013.01); *G06F 2201/84* (2013.01)

(58) Field of Classification Search
CPC ............. G06F 11/0793; G06F 11/0751; G06F 11/079; G06F 11/1451; G06F 11/14;
(Continued)

(56) References Cited

U.S. PATENT DOCUMENTS

| | | | |
|---|---|---|---|
| 6,742,141 B1 | 5/2004 | Miller | |
| 8,001,527 B1 * | 8/2011 | Qureshi | G06N 5/048 717/100 |

(Continued)

FOREIGN PATENT DOCUMENTS

| | | |
|---|---|---|
| CA | 2819938 A1 | 4/2014 |
| WO | 2009146979 A1 | 12/2009 |

OTHER PUBLICATIONS

Anonymous, "Method and System for Simulating Computer Execution by Using System Snapshots," An IP.com Prior Art Database Technical Disclosure, Mar. 25, 2011, p. 1, IP.com No. 000205301.
(Continued)

*Primary Examiner* — Michael Maskulinski
*Assistant Examiner* — Anthony J Amoroso
(74) *Attorney, Agent, or Firm* — Patricia B. Feighan

(57) ABSTRACT

A method to resolve or prevent a computer system failure is provided. The method may include capturing a plurality of snapshots associated with a computer system installation environment during a plurality of key times. The method may also include measuring each snapshot within the captured plurality of snapshots according to a measure of system health. The method may further include using each measured snapshot to develop a plurality of learned patterns of good and bad software installations. The method may additionally include providing a probability associated with a proposed installation operation based on the developed plurality of learned patterns of good and bad software installations. The method may also include providing at least one installation recommendation in response to a recovery from a system failure, whereby the provided at least one installation recommendation is based on the developed plurality of learned patterns of good and bad software installations.

20 Claims, 7 Drawing Sheets

(58) Field of Classification Search
CPC ............. G06F 11/1415; G06F 11/1433; G06F 11/1435; G06F 11/16; G06F 11/3051; G06F 11/36; G06F 11/3604; G06F 2201/84; G06F 17/30088
See application file for complete search history.

(56) References Cited

U.S. PATENT DOCUMENTS

| | | | |
|---|---|---|---|
| 8,140,905 B2* | 3/2012 | Beaty | H04L 41/16 714/35 |
| 8,453,027 B2 | 5/2013 | Bartz et al. | |
| 8,640,123 B2 | 1/2014 | Wookey | |
| 8,725,839 B2 | 5/2014 | Madduri et al. | |
| 8,949,187 B1* | 2/2015 | Satish | G06F 11/1461 707/640 |
| 2010/0131952 A1* | 5/2010 | Akiyama | G06F 11/0748 718/100 |
| 2010/0218031 A1 | 8/2010 | Agarwal et al. | |
| 2011/0197097 A1 | 8/2011 | Beaty et al. | |
| 2015/0154062 A1* | 6/2015 | Watanabe | G06F 11/0727 714/26 |

OTHER PUBLICATIONS

Mell et al., "The NIST Definition of Cloud Computing," National Institute of Standards and Technology, Sep. 2011, p. 1-3, Special Publication 800-145.
Wikipedia, "Statistical Classification," Wikipedia: the Free Encyclopedia, Last Modified on Oct. 17, 2014, p. 1-6, http://en.wikipedia.org/wiki/Statistical_classification, Accessed on May 5, 2015.

* cited by examiner

RESOLVING AND PREVENTING COMPUTER SYSTEM FAILURES CAUSED BY CHANGES TO THE INSTALLED SOFTWARE

BACKGROUND

The present invention relates generally to the field of computers, and more particularly to computer system failures.

Computer system users often run into software bugs and incompatibilities that can be difficult and time consuming to resolve. This is typically due to changes, such as software upgrades having incompatibilities with each other or with particular hardware configurations, which can have significant impact to system functionality.

SUMMARY

According to one embodiment, a method to resolve or prevent a computer system failure is provided. The method may include capturing a plurality of snapshots associated with a computer system installation environment during a plurality of key times. The method may also include measuring each snapshot within the captured plurality of snapshots according to a measure of system health. The method may further include using each measured snapshot within the captured plurality of snapshots to develop a plurality of learned patterns of good and bad software installations. The method may additionally include providing a probability associated with a proposed installation operation based on the developed plurality of learned patterns of good and bad software installations. The method may also include providing at least one installation recommendation in response to a recovery from a system failure, whereby the provided at least one installation recommendation is based on the developed plurality of learned patterns of good and bad software installations.

According to another embodiment, a computer system to resolve or prevent a computer system failure is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include capturing a plurality of snapshots associated with a computer system installation environment during a plurality of key times. The method may also include measuring each snapshot within the captured plurality of snapshots according to a measure of system health. The method may further include using each measured snapshot within the captured plurality of snapshots to develop a plurality of learned patterns of good and bad software installations. The method may additionally include providing a probability associated with a proposed installation operation based on the developed plurality of learned patterns of good and bad software installations. The method may also include providing at least one installation recommendation in response to a recovery from a system failure, whereby the provided at least one installation recommendation is based on the developed plurality of learned patterns of good and bad software installations.

According to yet another embodiment, a computer program product to resolve or prevent a computer system failure is provided. The computer program product may include one or more computer-readable storage devices and program instructions stored on at least one of the one or more tangible storage devices, the program instructions executable by a processor. The computer program product may include program instructions to capture a plurality of snapshots associated with a computer system installation environment during a plurality of key times. The computer program product may also include program instructions to measure each snapshot within the captured plurality of snapshots according to a measure of system health. The computer program product may further include program instructions to use each measured snapshot within the captured plurality of snapshots to develop a plurality of learned patterns of good and bad software installations. The computer program product may additionally include program instructions to provide a probability associated with a proposed installation operation based on the developed plurality of learned patterns of good and bad software installations. The computer program product may also include program instructions to provide at least one installation recommendation in response to a recovery from a system failure, whereby the provided at least one installation recommendation is based on the developed plurality of learned patterns of good and bad software installations.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
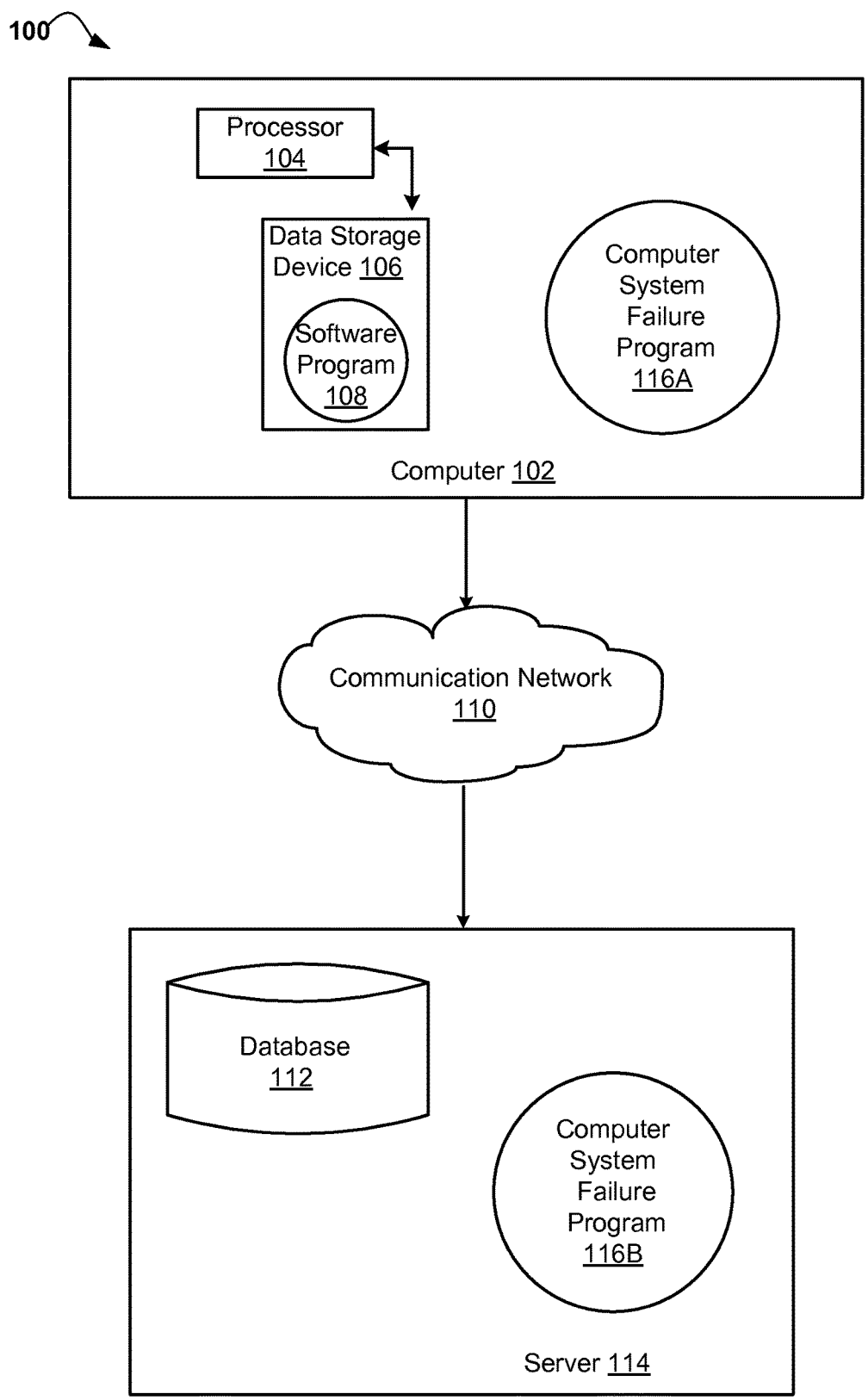
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to computer system failures. The following described exemplary embodiments provide a system, method and program product to, among other things, resolve and prevent computer system failures caused by changes to the installed software. Therefore, the present embodiment has the capacity to improve the technical field of resolving and preventing computer system failures by learning the patterns of good and bad system installs. More specifically, the present embodiment may take snapshots of a computer system installation environment at key times. For example, a snapshot may be taken prior to or just after an installation of software, during the recovery from a system crash, or during a scheduled sampling period.

As previously described, computer system users often run into software bugs and incompatibilities that can be difficult and time consuming to resolve. This is typically due to changes, such as software upgrades having incompatibilities with each other or with particular hardware configurations, which can have significant impact to system functionality. Currently, manual searching may be performed to find a solution to the problem. However, manual searching may be time consuming, may require expert knowledge, and may not provide a solution to a specific case. Furthermore, error reporting tools (such as automatic operating system error tools) that work via a similar mechanism do not track successful operations to determine what has changed and do not consider combinations of software as the cause of the problem. Additionally, other methods may record a profile and set thresholds on individual measures (measuring healthiness of individual components rather than of the entire system) which may only be applicable to a system of discrete measure. As such, it may be advantageous, among other things, to provide a solution that has no notion of what is healthy or not based on a preconceived notion, but rather learn based on collected data of a combination of pieces in the environment which may more quickly understand and resolve software problems.

According to at least one implementation, the present embodiment may take snapshots of healthy systems as well as systems in error. Therefore, by comparing multiple systems in error with multiple healthy systems, the present embodiment may also determine the cause and solution to the error. Additionally, the present embodiment may detect errors before they occur and as such, prevent the errors from happening or predict the errors before they occur. More specifically, the present embodiment maintains a status of the system environment as healthy, unhealthy, and unknown (i.e., to be determined (TBD)) and compares and contrasts the current system status with other statuses to determine a health rating or solutions. Therefore, by not being restricted to set ranges and parameters, and by looking at differences between statuses, the present embodiment may determine not only healthy systems, but potentially the causes of problems and also prevent a system from entering in to unhealthy states.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to resolve and prevent computer system failures caused by changes to the installed software.

As previously described, according to at least one implementation, the present embodiment may take snapshots of a computer system installation environment at key times. For example, a snapshot may be taken just prior to or just after an installation of software; during a recovery from a system crash; or during a scheduled sampling period. Additionally, the snapshots are given a measure of system health, which may be a rating of "good", "bad" or "to be determined" (TBD) (i.e., unknown) and uploaded to a central server. Then, these snapshots may be used to train an analysis engine (i.e., a classifier). In machine learning and statistics, classification is the problem of identifying to which of a set of categories (sub-populations) a new observation belongs, on the basis of a training set of data containing observations (or instances) whose category membership is known. As such, the analysis engine may use "good" and "bad" snapshots to train a classifier. Additionally, the analysis engine may match a new target snapshot against a "good" and "bad" classifier to calculate probability of being potentially dangerous.

According to at least one implementation, the present embodiment may use the analysis engine in two ways. First, prior to performing an installation, the analysis engine may provide a probability that the install operation will result in a more or less stable system. Secondly, when recovering from a system failure, the analysis engine may provide installation action recommendations (including an install or an uninstall of the software) that can improve the system stability.

As such, the present embodiment may provide preventative warning measures for avoiding a computer system failure automatically which may avoid potential system downtime, data loss or corruption. Additionally, the present embodiment may provide problem diagnosis information to help pinpoint potential sources of a problem and resolve it.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Computer System Failure Program 116A. The networked computer environment 100 may also include a server 114 that is enabled to run a Computer System Failure Program 116B that may interact with a database 112 and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Computer System Failure Program 116B running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Computer System Failure Program 116A, 116B may interact with a database 112 that may be embedded in various storage devices, such as, but not limited to a computer 102, a networked server 114, or a cloud storage service.

As previously described, the client computer 102 may access the Computer System Failure Program 116B, running on server computer 114 via the communications network 110. For example, a user using a client computer 102 may access the Computer System Failure Program 116A, 116B, running on client computer 102, and server computer 114, respectively via the communications network 110. For example, a user using client computer 102 may connect via a communication network 110 to the Computer System Failure Program 116B which may be running on server computer 114. The user may utilize the Computer System Failure Program 116A, 116B to resolve and prevent computer system failures caused by changes to the installed software. The Computer System Failure method is explained in more detail below with respect to FIGS. 3A-3B.

Figure 2:
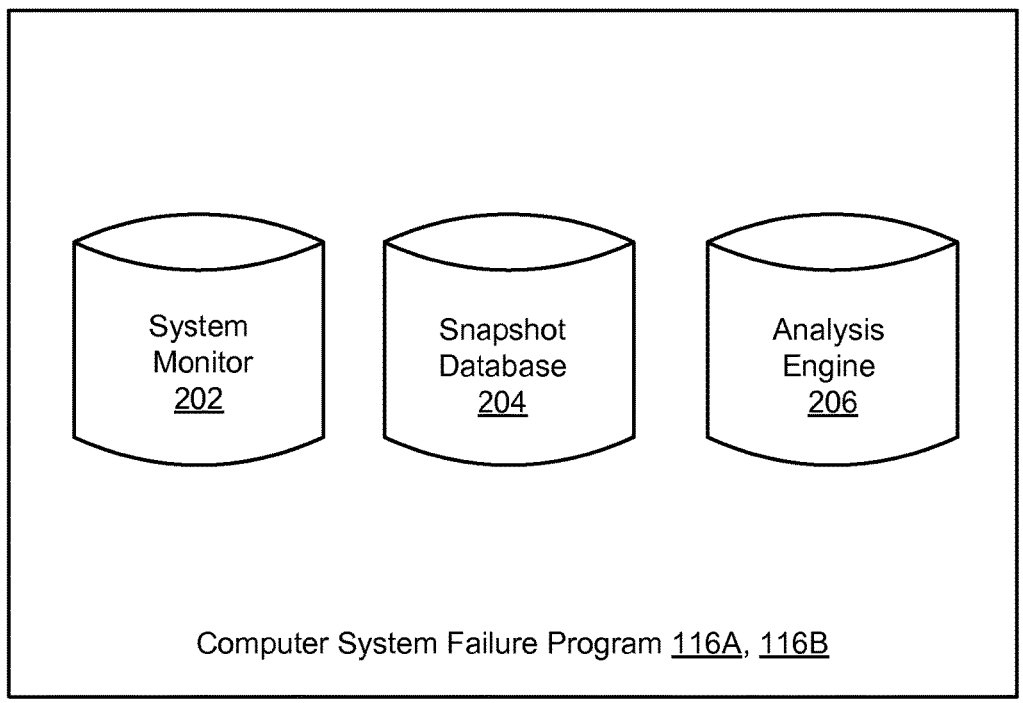
FIG. 2 illustrates an exemplary illustration of the components associated with the Computer System Failure Program according to one embodiment.

Referring now to FIG. 2, an exemplary illustration 200 of the components associated with the Computer System Failure Program 116A, 116B in accordance with one embodiment is depicted. The following definitions may be used with respect to the components described in FIG. 2 and throughout the disclosure described herein:

A Snapshot: a text based record of the current or "to be" state of a computer system, including:
  Software installed (including version number and timestamp of install)
  Hardware installed (including driver versions and timestamp of install)
  Operation system installed (including version and maintenance patches applied)
'Analysis' process (for example):
  Compares a set of system snapshots to isolate the common factor/s, to determine the most probable source of the problem.

According to at least one implementation, the present embodiment may operate using a system monitor component 202, a snapshot database 204, and an analysis engine 206. The system monitor 202 may record and upload snapshots of a computer system installation environment periodically or after each change, with or without user initiation. As such, the system monitor 202 may precompute the expected outcome state of installing new software and may check this expected outcome against an analysis engine 206 for known outcomes to determine whether or not the installation is potentially dangerous. Additionally, the system monitor 202 may warn the user if the proposed installation combination is potentially dangerous to some level of probability.

Furthermore, when a problem occurs, the system monitor 202 may upload a current snapshot as an example of a problematic software combination. Then, if a matching problem snapshot (based on a probabilistic match, not an exact match) is found to already exist in the snapshot database 204, the system monitor 202 may return any possible solutions or changes that could be made (such as updating software to a lower or higher version, or removing software entirely).

The snapshot database 204 stores raw system snapshots; marks snapshots as potentially "bad" when the owner reports a software problem; and marks snapshots as "good" or "to be determined" (TBD); or uses "time without problem" as an indicator of goodness, which may be used as a weight for the analysis engine 206.

The analysis engine 206 uses "good" and "bad" snapshots to train a classifier. Additionally, the analysis engine 206 may match a new target snapshot against a "good" and "bad" classifier to calculate probability of being potentially dangerous. Furthermore, the analysis engine 206 matches known problematic software combinations to seemingly healthy snapshots (e.g., based on time without failure) to suggest user actions that could resolve the problem (e.g. updating a software component). Then, when changes are made to a problematic snapshot, the analysis engine 206 may record changes as potential solution. The analysis engine 206 may also disqualify solutions if reports are received where the problem is still occurring.

Figure 3A:
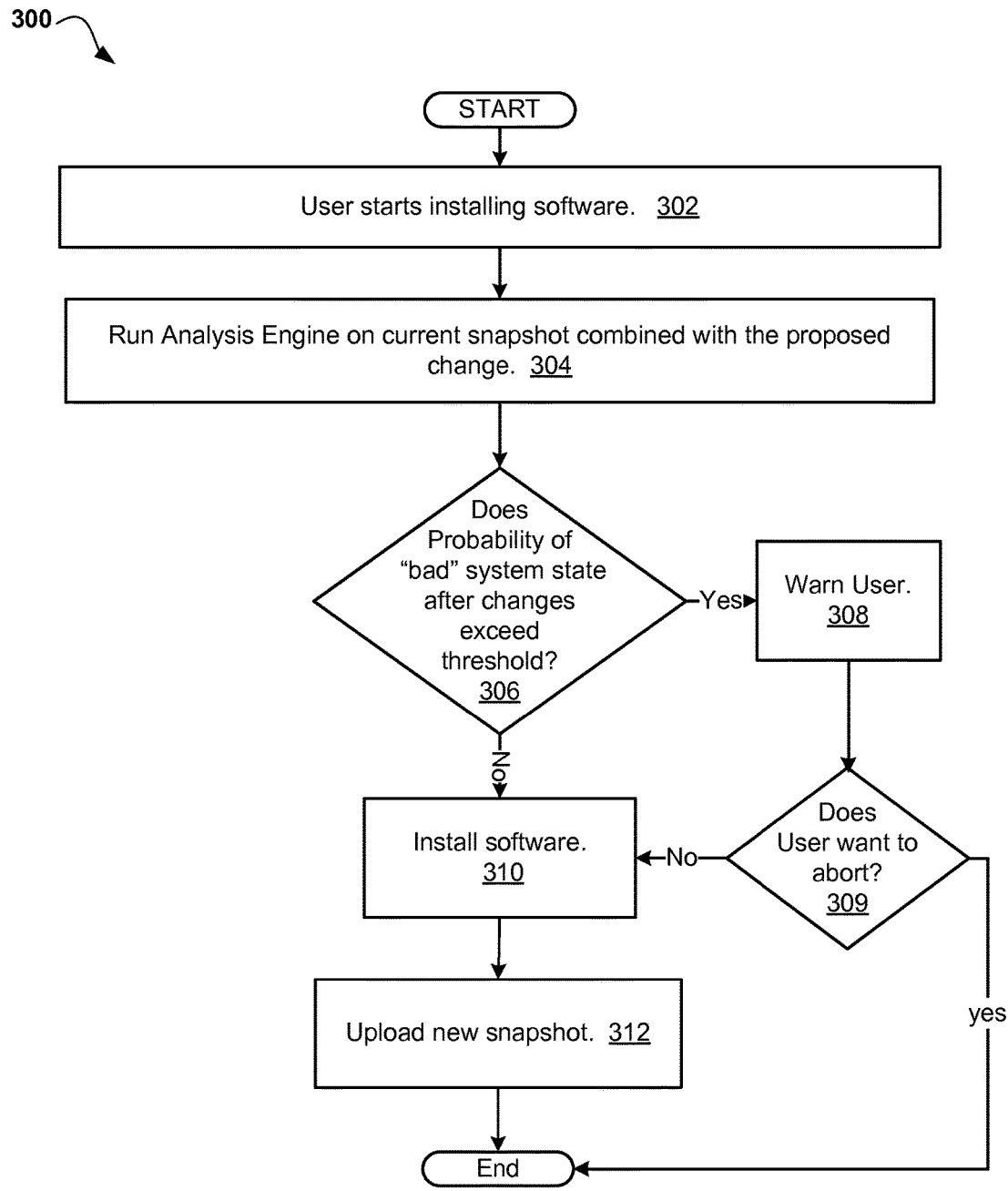
FIGS. 3A-3B are operational flowcharts illustrating the steps carried out by a program to resolve and prevent computer system failures caused by changes to the installed software according to one embodiment.
Figure 3B:
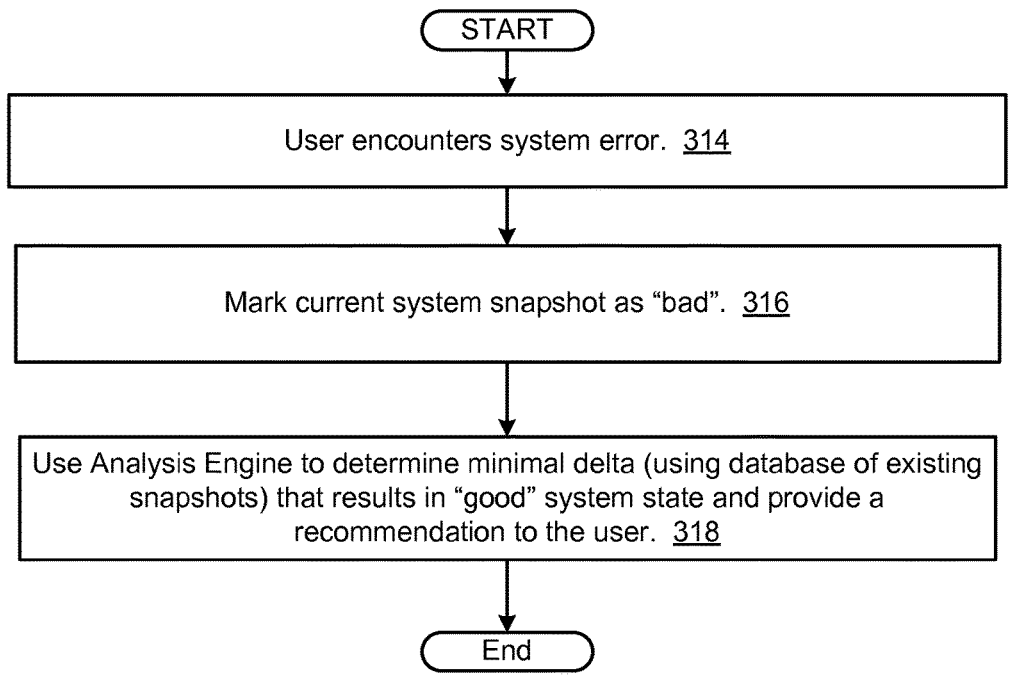

Referring now to FIGS. 3A-3B, operational flowcharts 300 illustrating the steps carried out by a program to resolve and prevent computer system failures caused by changes to the installed software is depicted. As previously described, the Computer System Failure Program 116A, 116B (FIG. 1) may resolve and prevent computer system failures caused by changes to the installed software through learned patterns of good and bad system installs. Snapshots of a computer system installation environment may be taken at key times, such as just prior to or just after an install; during recovery from a system crash; or during a scheduled sampling period. Then, snapshots are given a measure of system health, which may be a measure of "good", "bad" or "to be determined" ("TBD") (i.e., unknown) and uploaded to a central server, such as server 114 (FIG. 1). These snapshots may then be used to train the analysis engine 206 (FIG. 2). The present embodiment may use the analysis engine 206 (FIG. 2) prior to performing an installation to provide a probability that the install operation will result in a more or less stable system or when recovering from a system failure to provide installation action recommendations that can improve the system stability.

Therefore with respect to FIG. 3A at 302, a user starts installing software. Then at 304, the Computer System Failure Program 116A, 116B (FIG. 1) runs the analysis engine 206 (FIG. 2) on the current snapshot combined with the proposed change. For example, a current system snapshot may be "CDE", trying to install "A" (where each letter is a different piece of software/hardware/firmware).

Next at 306 it is determined whether the probability of a "bad" system state after change exceeds the threshold (i.e., determine whether the system is predicted to improve or deteriorate and/or by how much which may be compared to the threshold). As previously described a threshold may be specified and predetermined by a user. As such, if at 306 it is determined that the probability of a "bad" system state after change exceeds the threshold, then the method may continue to step 308 to warn the user. Then, at 309 it is determined whether the user wants to abort the install or continue with the install. If at 309 it is determined that the user wants to abort the install, then the method may end. However, if at 309 it is determined that the user does not want to abort the install, then the method may proceed to step 310 to install the software. However, if at 306 it is determined that the probability of a "bad" system state after change does not exceed the threshold, then the method may continue to step 310 to install the software. Then at 312 a new snapshot is uploaded.

With respect to the above example, the present embodiment may find all "bad" snapshots in the snapshot database 204 (FIG. 2) that contain "A" as well as any items from the current system snapshot (A+BDE; A+E; A+DE). Then, the present embodiment may find the longest common subsequence/s (via a standard computer science algorithm) of these "bad" snapshots (A+E) and calculate the percentage of subsequence/s contained within new system snapshot (excluding the new piece of software). For example, E in CDE=100%. Then, if the percentage exceeds user specified threshold (e.g. 70%), the user would be warned before installation (i.e., 100%>70%->Warn user).

With respect to FIG. 3B at 314, a user encounters a system error. Then at 316, the Computer System Failure Program 116A, 116B (FIG. 1) marks a current system snapshot as "bad". Next at 318, the analysis engine 206 (FIG. 2) is used to determine a minimal delta (using the database of existing snapshots (i.e., the snapshot database 204 (FIG. 2)) that results in a "good" system state. According to at least one implementation, a system failure may be recognized by the System Monitor 202 (FIG. 2) setting up an event listener for operating system/application abends (abnormal ends) or error messages, e.g. using a "user exit" or SLIP TRAP in z/OS. Additionally, the method may provide installation action recommendations (including an install or an uninstall of the software) that can improve the system stability.

It may be appreciated that FIGS. 3A-3B provide only an illustration of one implementation and does not imply any limitations with regard to how different embodiments may be implemented. Many modifications to the depicted environments may be made based on design and implementation requirements. For example, according to at least one implementation, the predetermined specified threshold may be set or modified by a user or predetermined by the application.

The present embodiment focuses on discovering the cause of system failures and warning users about more difficult to identify problems that occur at any time after a seemingly successful installation. Additionally, the present embodiment has the capacity to learn dynamically from snapshots submitted by users as they encounter new problems and significantly, notify the user pre-emptively (e.g., via a warning message or via a graphical user interface (GUI)), before problems are encountered. As such, the known "good" and "bad" system snapshots (determined automatically, not by manual annotation) are aggregated from multiple users/environments to provide pre-emptive warnings rather than post-installation. Therefore, the present embodiment is able to determine warnings by learning from user submitted system snapshots which encounter problems during a time after the installation of that software without requiring or using a simulation on another system to diagnose error scenarios. As previously explained, the present embodiment focuses on recognizing problematic software installation combinations, using a database of system snapshots 204 (FIG. 2) known to be "good" or "bad".

Figure 4:
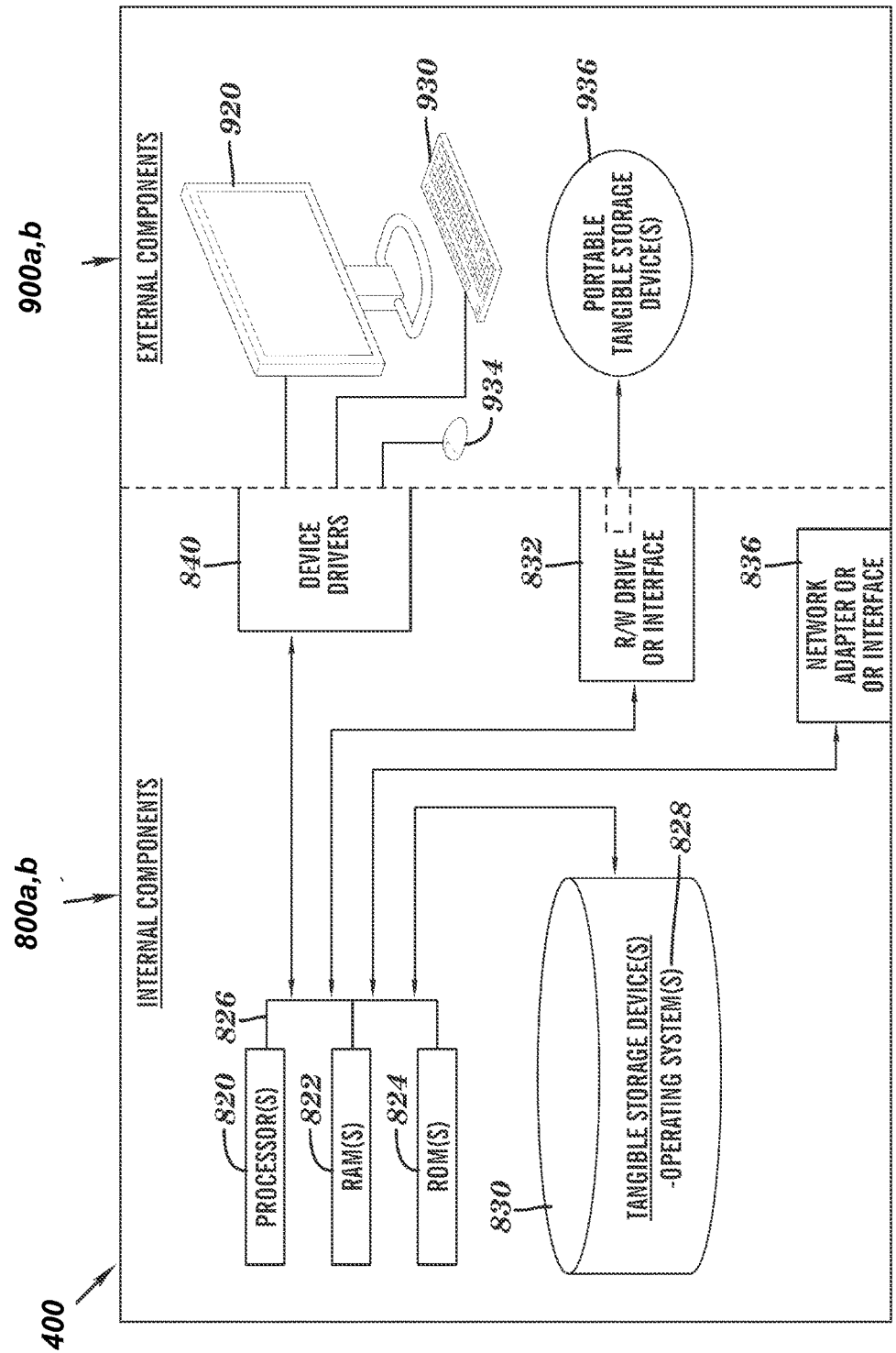
FIG. 4 is a block diagram of internal and external components of computers and servers depicted in FIG. 1 according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 4. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Computer System Failure Program 116A (FIG. 1) in client computer 102 (FIG. 1) and the Computer System Failure Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Computer System Failure Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Computer System Failure Program 116A (FIG. 1) in client computer 102 (FIG. 1) and the Computer System Failure Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Computer System Failure Program 116A (FIG. 1) in client computer 102 (FIG. 1) and the Computer System Failure Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices.

Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
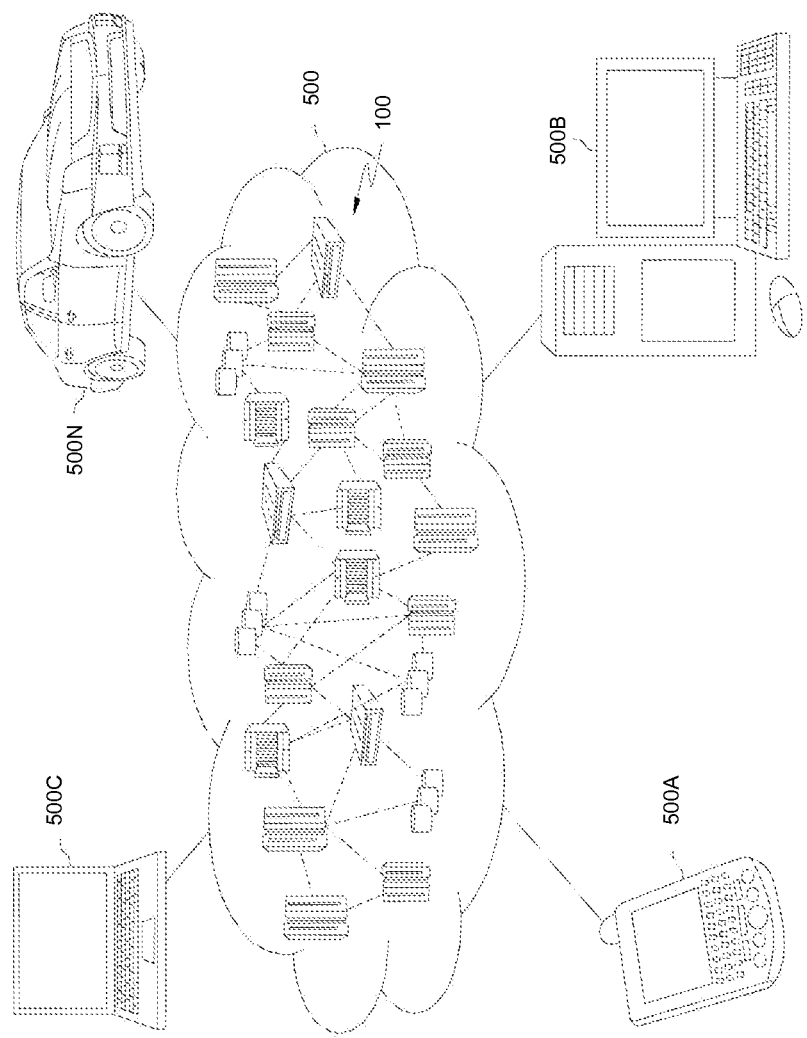
FIG. 5 is a block diagram of an illustrative cloud computing environment including the computer system depicted in FIG. 1, according to one embodiment.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
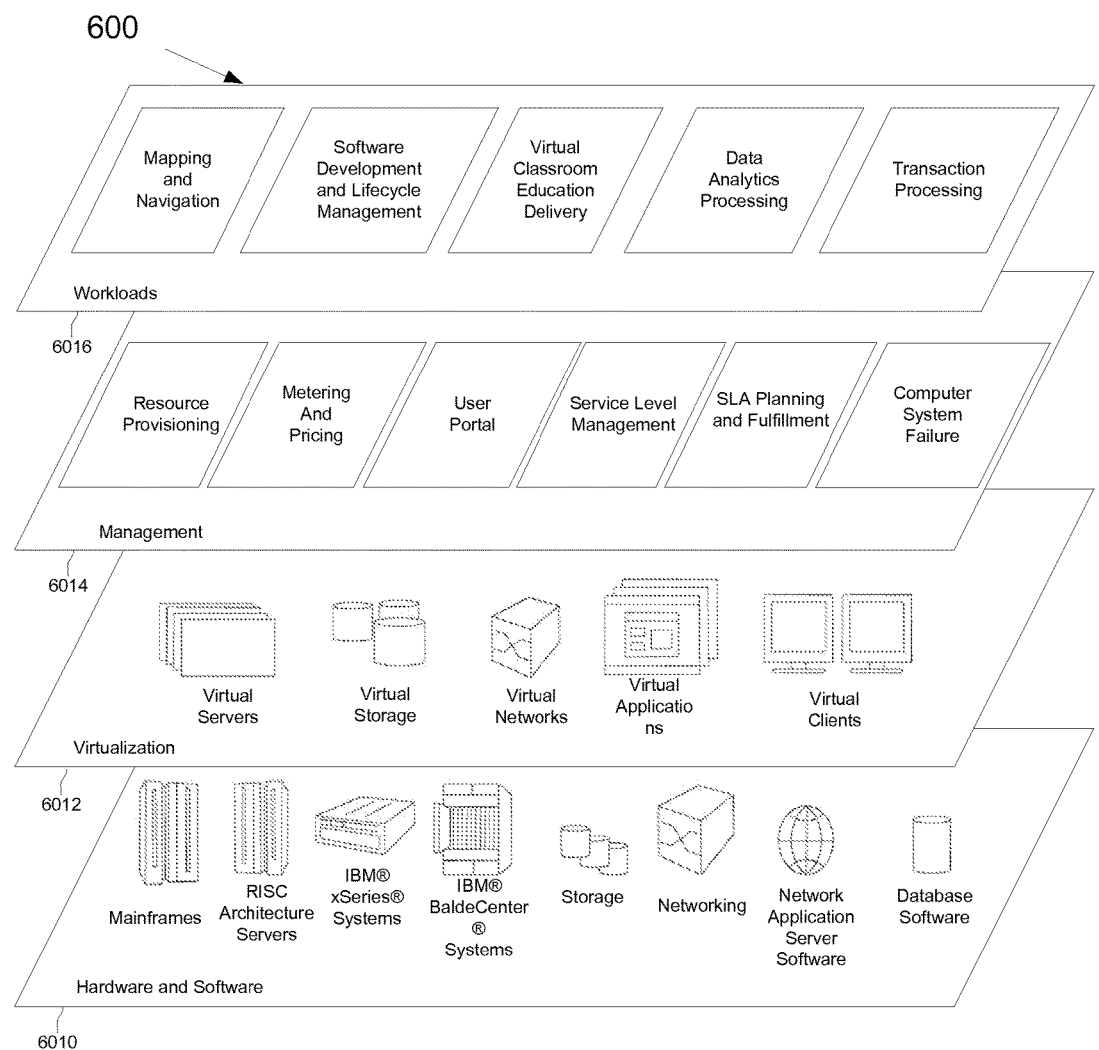
FIG. 6 is a block diagram of functional layers of the illustrative cloud computing environment of FIG. 5, according to one embodiment.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 6010 includes hardware and software components. Examples of hardware components include: mainframes; RISC (Reduced Instruction Set Computer) architecture based servers; storage devices; networks and networking components. In some embodiments, software components include network application server software.

Virtualization layer 6012 provides an abstraction layer from which the following examples of virtual entities may be provided: virtual servers; virtual storage; virtual networks, including virtual private networks; virtual applications and operating systems; and virtual clients.

In one example, management layer 6014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Computer System Failure Program may resolve and prevent computer system failures caused by changes to the installed software.

Workloads layer 6016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to resolve or prevent a computer system failure, the method comprising:

capturing a plurality of snapshots associated with a computer system installation environment during a plurality of key times;

measuring each snapshot within the captured plurality of snapshots according to a measure of system health, wherein the measuring is determined using an online database of system snapshots;

using each measured snapshot within the captured plurality of snapshots to develop a plurality of learned patterns of good and bad software installations, wherein the plurality of learned patterns are automatically recorded and uploaded in the online database of system snapshots;

providing a probability associated with a proposed installation operation based on the developed plurality of learned patterns of good and bad software installations and based on a matching of the proposed installation operation to a problem snapshot contained in the online database of system snapshots, wherein the online database of system snapshots is updated automatically and includes a plurality of automatic system snapshots associated with a plurality of users and a plurality of user environments, and wherein the provided probability is determined based on a calculated percentage of a longest common plurality of subsequences being greater than a predetermined, user-defined threshold;

in response to the provided probability associated with the proposed installation operation exceeding the predetermined, user-defined threshold, providing a pre-emptive warning to a user, via a graphical user interface, that the computer system installation environment is predicted to deteriorate, wherein the pre-emptive warning is displayed prior to a system failure occurring; and providing at least one installation recommendation in response to a recovery from a system failure, wherein the provided at least one installation recommendation is based on the developed plurality of learned patterns of good and bad software installations and based on the matching of the proposed installation operation to the problem snapshot contained in the online database of system snapshots.

2. The method of claim 1, wherein the computer system failure is caused by at least one change to at least one installed software.

3. The method of claim 1, wherein the computer system failure is resolved or prevented based on the plurality of learned patterns of good and bad software installations.

4. The method of claim 1, wherein the plurality of key times includes prior to an installation of a software, just after an installation of a software, during the recovery from a system crash, or during a scheduled sampling period.

5. The method of claim 1, wherein the measure of system health includes a rating of good, a rating of bad, or a rating of to be determined (TBD).

6. The method of claim 1, wherein the provided probability includes a determination as to whether the proposed installation operation is a stable system.

7. The method of claim 1, wherein the provided at least one installation recommendation can improve stability of a system associated with the recovery of the system failure.

8. A computer system to resolve or prevent a computer system failure, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

capturing a plurality of snapshots associated with a computer system installation environment during a plurality of key times;

measuring each snapshot within the captured plurality of snapshots according to a measure of system health, wherein the measuring is determined using an online database of system snapshots;

using each measured snapshot within the captured plurality of snapshots to develop a plurality of learned patterns of good and bad software installations, wherein the plurality of learned patterns are automatically recorded and uploaded in the online database of system snapshots;

providing a probability associated with a proposed installation operation based on the developed plurality of learned patterns of good and bad software installations and based on a matching of the proposed installation operation to a problem snapshot contained in the online database of system snapshots, wherein the online database of system snapshots is updated automatically and includes a plurality of automatic system snapshots associated with a plurality of users and a plurality of user environments, and wherein the provided probability is determined based on a calculated percentage of a longest common plurality of subsequences being greater than a predetermined, user-defined threshold;

in response to the provided probability associated with the proposed installation operation exceeding the predetermined, user-defined threshold, providing a pre-emptive warning to a user, via a graphical user interface, that the computer system installation environment is predicted to deteriorate, wherein the pre-emptive warning is displayed prior to a system failure occurring; and providing at least one installation recommendation in response to a recovery from a system failure, wherein the provided at least one installation recommendation is based on the developed plurality of learned patterns of good and bad software installations and based on the matching of the proposed installation operation to the problem snapshot contained in the online database of system snapshots.

9. The computer system of claim 8, wherein the computer system failure is caused by at least one change to at least one installed software.

10. The computer system of claim 8, wherein the computer system failure is resolved or prevented based on the plurality of learned patterns of good and bad software installations.

11. The computer system of claim 8, wherein the plurality of key times includes prior to an installation of a software, just after an installation of a software, during the recovery from a system crash, or during a scheduled sampling period.

12. The computer system of claim 8, wherein the measure of system health includes a rating of good, a rating of bad, or a rating of to be determined (TBD).

13. The computer system of claim 8, wherein the provided probability includes a determination as to whether the proposed installation operation is a stable system.

14. The computer system of claim 8, wherein the provided at least one installation recommendation can improve stability of a system associated with the recovery of the system failure.

15. A computer program product to resolve or prevent a computer system failure, the computer program product comprising:

one or more computer-readable storage devices and program instructions stored on at least one of the one or more tangible storage devices, the program instructions executable by a processor, the program instructions comprising:

program instructions to capture a plurality of snapshots associated with a computer system installation environment during a plurality of key times;

program instructions to measure each snapshot within the captured plurality of snapshots according to a measure of system health, wherein the measuring is determined using an online database of system snapshots;

program instructions to use each measured snapshot within the captured plurality of snapshots to develop a plurality of learned patterns of good and bad software installations, wherein the plurality of learned patterns are automatically recorded and uploaded in the online database of system snapshots;

program instructions to provide a probability associated with a proposed installation operation based on the developed plurality of learned patterns of good and bad software installations and based on a matching of the proposed installation operation to a problem snapshot contained in the online database of system snapshots, wherein the online database of system snapshots is updated automatically and includes a plurality of automatic system snapshots associated with a plurality of users and a plurality of user environments, and wherein the provided probability is determined based on a calculated percentage of a longest common plurality of subsequences being greater than a predetermined, user-defined threshold;

in response to the provided probability associated with the proposed installation operation exceeding the predetermined, user-defined threshold, program instructions to provide a pre-emptive warning to a user, via a graphical user interface, that the computer system installation environment is predicted to deteriorate, wherein the pre-emptive warning is displayed prior to a system failure occurring; and program instructions to provide at least one installation recommendation in response to a recovery from a system failure, wherein the provided at least one installation recommendation is based on the developed plurality of learned patterns of good and bad software installations and based on the matching of the proposed installation operation to the problem snapshot contained in the online database of system snapshots.

16. The computer program product of claim 15, wherein the computer system failure is caused by at least one change to at least one installed software.

17. The computer program product of claim 15, wherein the computer system failure is resolved or prevented based on the plurality of learned patterns of good and bad software installations.

18. The computer program product of claim 15, wherein the plurality of key times includes prior to an installation of a software, just after an installation of a software, during the recovery from a system crash, or during a scheduled sampling period.

19. The computer program product of claim 15, wherein the measure of system health includes a rating of good, a rating of bad, or a rating of to be determined (TBD).

20. The computer program product of claim 15, wherein the provided probability includes a determination as to whether the proposed installation operation is a stable system.

* * * * *